United States Patent
Watanabe et al.

(10) Patent No.: US 12,163,495 B2
(45) Date of Patent: Dec. 10, 2024

(54) CONTROL APPARATUS FOR INTERNAL COMBUSTION ENGINE

(71) Applicant: HONDA MOTOR CO., LTD., Tokyo (JP)

(72) Inventors: Hayato Watanabe, Tokyo (JP); Satoshi Kozuka, Tokyo (JP); Jun Iida, Tokyo (JP); Nobukazu Asano, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/327,206

(22) Filed: Jun. 1, 2023

(65) Prior Publication Data

US 2023/0400002 A1 Dec. 14, 2023

(30) Foreign Application Priority Data

Jun. 10, 2022 (JP) ................. 2022-094701

(51) Int. Cl.
*G01M 15/11* (2006.01)
*F02P 5/152* (2006.01)
*F02P 17/04* (2006.01)

(52) U.S. Cl.
CPC ............. *F02P 17/04* (2013.01); *F02P 5/1521* (2013.01); *G01M 15/11* (2013.01)

(58) Field of Classification Search
CPC ......... F02D 2200/1015; F02D 2200/10; F02D 2200/0804; F02D 2200/0802
See application file for complete search history.

(56) References Cited

U.S. PATENT DOCUMENTS

| | | | | |
|---|---|---|---|---|
| 5,559,285 A | * | 9/1996 | Bryant | ................ G01M 15/106 123/406.27 |
| 2021/0053577 A1 | * | 2/2021 | Hashimoto | ............ G06N 5/046 |
| 2021/0056781 A1 | * | 2/2021 | Hashimoto | ......... F02D 41/1497 |

FOREIGN PATENT DOCUMENTS

| | | | |
|---|---|---|---|
| DE | 10231951 A1 * | 4/2003 | ......... F02D 41/1458 |
| JP | H06173745 A * | 6/1994 | |

(Continued)

OTHER PUBLICATIONS

JP2008267292A—description (Year: 2008).*

(Continued)

*Primary Examiner* — George C Jin
*Assistant Examiner* — Teuta B Holbrook
(74) *Attorney, Agent, or Firm* — Carter, DeLuca & Farrell LLP (57) ABSTRACT

A control apparatus, for an internal combustion engine, detects a rotational speed parameter (time parameter) that represents a rotational speed of the internal combustion engine including a plurality of cylinders, detects a single misfire that is a misfire for every ignition for each of the plurality of cylinders, based on the rotational speed parameter that has been detected in each combustion stroke of the plurality of cylinders (steps 2 to 7 and 9), counts, as a misfire counter value, the number of times that the single misfire has been detected for each of the plurality of cylinders (steps 8 and 10), determines whether the misfire is occurring in the cylinder, based on the misfire counter value (steps 11 to 12), and corrects an ignition timing of the cylinder that has been determined that the misfire is occurring to an advance angle side (steps 25, 26, and 34).

2 Claims, 7 Drawing Sheets

(56) References Cited

FOREIGN PATENT DOCUMENTS

| | | | | | |
|---|---|---|---|---|---|
| JP | H07-119535 | A | | 5/1995 | |
| JP | 2004156597 | A | * | 6/2004 | ........... F01N 3/2006 |
| JP | 2008267292 | A | * | 11/2008 | |
| JP | 2009293501 | A | * | 12/2009 | |
| JP | 2020125726 | A | * | 8/2020 | |
| KR | 102403786 | B1 | * | 5/2021 | |
| KR | 20210054850 | A | * | 5/2022 | |
| KR | 20220063502 | A | * | 5/2022 | |

OTHER PUBLICATIONS

JPH06173745—description (Year: 1994).*
KR 102403786 English Translation (Year: 2022).*
KR 20210054850 English Translation (Year: 2021).*
Notice of Reasons for Refusal issued by the Japanese Patent Office on Aug. 29, 2023 in corresponding JP Patent Application No. 2022-094701, with English translation.

* cited by examiner

CONTROL APPARATUS FOR INTERNAL COMBUSTION ENGINE

BACKGROUND

Technical Field

The present invention relates to a control apparatus for an internal combustion engine, and particularly to a control apparatus that determines a misfire state and that controls an ignition timing in accordance with a determination result.

Related Art

As a conventional misfire determination apparatus for an internal combustion engine, for example, the apparatus disclosed in JP H07-119535 A is known. In this apparatus, a rotational change amount of the internal combustion engine is calculated for every ignition operation during a predetermined misfire determination period (for example, corresponding to 200 rotations of the internal combustion engine). In a case where such a rotational change amount exceeds a single misfire determination value, it is considered that a single misfire (individual misfire in each ignition) has been detected, and the number of detection times is counted as a misfire counter value. In addition, whenever the single misfire is detected, a total misfire determination value is updated in accordance with an operating state (rotation speed, load, water temperature, or the like) of the internal combustion engine at that time.

Then, at the end of the misfire determination period, the misfire counter value and the total misfire determination value are compared with each other. In a case where the misfire counter value exceeds the total misfire determination value, it is determined that a misfire has occurred in the misfire determination period. Accordingly, the presence or absence of the misfire in the misfire determination period is determined in a comprehensive manner, while the operating state of the internal combustion engine that affects the likelihood of an occurrence of the misfire is being reflected.

CITATION LIST

Patent Literature

Patent Literature 1: JP H07-119535 A

SUMMARY

In the above-described conventional misfire determination apparatus, however, the cylinder in which the misfire has occurred is not identified, and the presence or absence of the misfire in a predetermined misfire determination period is merely determined in a comprehensive manner. In addition, the cylinder in which the misfire has occurred is not identifiable. Hence, control for suppressing the misfire for the cylinder and stabilizing a combustion state cannot be conducted appropriately, thereby leading to degradation of exhaust gas characteristics and idle stability.

The present invention has been made to solve the above problems, and has an object to provide a control apparatus for an internal combustion engine, and the control apparatus is capable of improving the exhaust gas characteristics and idle stability by identifying a cylinder in which a misfire has occurred, and in addition, suppressing the misfire of the cylinder and stabilizing a combustion state.

In order to achieve such an object, a control apparatus for an internal combustion engine is provided according to a first aspect of the present invention, and the control apparatus includes: a rotational speed parameter detection unit (crank angle position sensor 13, ECU 2) configured to detect a rotational speed parameter (time parameter CRME, relative rotational speed OMGREF in one embodiment (hereinafter, the same will apply in the present paragraph)) that represents a rotational speed of the internal combustion engine 3 including a plurality of cylinders; a single misfire detection unit (ECU 2, steps 2 to 7 and 9 in FIG. 3) configured to detect a single misfire that is a misfire for every ignition for each of the plurality of cylinders, based on the rotational speed parameter that has been detected in each combustion stroke of the plurality of cylinders; a misfire counter (ECU2, steps 8 and 10) configured to count, as a misfire counter value C_MF(k), the number of times that the single misfire has been detected for each of the plurality of cylinders; a misfire determination unit (ECU2, steps 11 to 12) configured to determine whether the misfire is occurring in each of the plurality of cylinders, based on the misfire counter value C_MF(k); and an ignition timing correction unit (ECU2, steps 25 and 26 in FIG. 4 and step 34 in FIG. 5) configured to correct an ignition timing IGLOG of the cylinder that has been determined that the misfire is occurring to an advance angle side.

In such a control apparatus, the rotational speed parameter of the internal combustion engine is detected, and in addition, the single misfire (misfire for every ignition) is detected for every cylinder, based on the rotational speed parameter that has been detected in the combustion stroke of each cylinder. Then, it is determined whether the misfire is occurring in the cylinder, based on the misfire counter value that has been obtained by counting the number of detection times of the single misfire. In this manner, when the single misfire is detected in one cylinder on one occasion only, the single misfire having occurred in such one cylinder is not immediately determined. Instead, the presence or absence of the misfire in such one cylinder is determined, based on the misfire counter value that is the number of detection times of the single misfire for such one cylinder. Accordingly, the presence or absence of the misfire can be accurately detected for every cylinder without being directly affected by erroneous detection of the single misfire due to a temporary decrease in the rotational speed of the internal combustion engine, noise of the detection signal, or the like, and in addition, the cylinder in which the misfire has occurred can be identified.

In addition, the ignition timing of the cylinder in which it has been determined that the misfire is occurring is corrected to the advance angle side. Accordingly, the misfire of such a cylinder can be suppressed and the combustion state can be stabilized, and thus, exhaust gas characteristics and idle stability can be improved. Furthermore, by checking the combustion state when the ignition timing of the cylinder, in which the combustion is unstable and the misfire is suspected, is advanced in angle, it becomes possible to easily identify a case where the combustion is improved by the advance in angle and a case where the combustion is not improved by the advance in angle and the misfire is occurring for some reason. Accordingly, misfire detectability can be improved.

Figure 3:
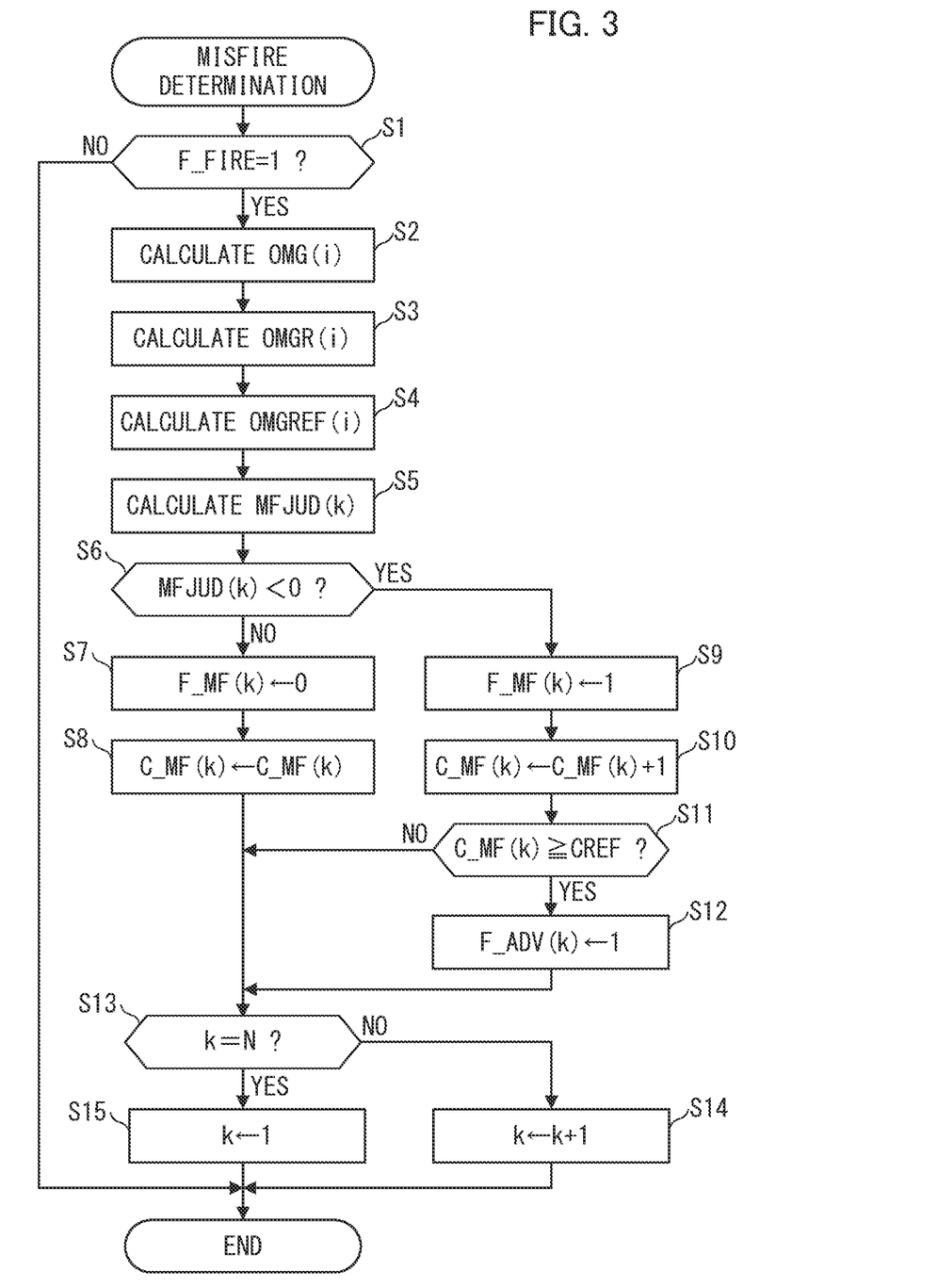
FIG. 3 is a flowchart illustrating misfire determination processing.

According to a second aspect of the present invention, in the control apparatus for the internal combustion engine described in the first aspect, the internal combustion engine 3 includes a catalyst (catalyst converter 7) for purifying exhaust gas, and the misfire determination unit determines the misfire, while catalyst warm-up control for controlling the ignition timing IGLOG to a retard angle side is being conducted to promote warm-up of the catalyst (FIG. 3).

The catalyst warm-up control is conducted by controlling the ignition timing to the retard angle side in order to promote warm-up of the catalyst immediately after the cold start of the internal combustion engine. Hence, a misfire is likely to occur. According to this configuration, the misfire determination and the advance angle correction of the ignition timing based on a determination result are made, while such catalyst warm-up control is being conducted. Thus, the effects of suppressing the misfire and stabilizing the combustion state can be effectively obtained in particular, according to the present invention.

According to a third aspect of the present invention, in the control apparatus for the internal combustion engine described in the first or second aspect, the misfire determination unit determines that the misfire is occurring in the cylinder, when the misfire counter value C_MF(k) reaches a predetermined value (threshold value CREF) (steps 11 and 12 in FIG. 3).

According to this configuration, it is determined that the misfire is occurring in the cylinder, when the misfire counter value reaches the predetermined value. Therefore, the presence or absence of the misfire and the identification of the cylinder in which the misfire has occurred can be accurately detected without being directly affected by erroneous detection of the single misfire due to a temporary decrease in the rotational speed of the internal combustion engine, noise of the detection signal, or the like.

Figure 5:
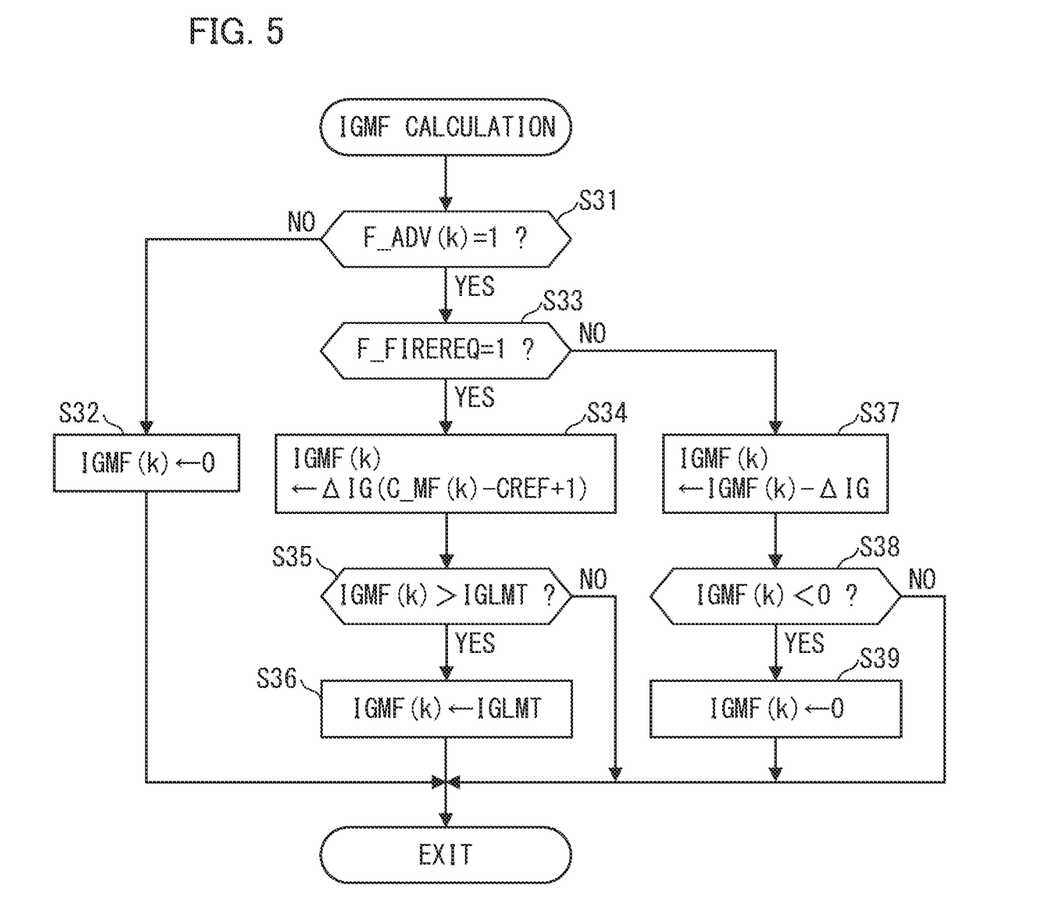
FIG. 5 is a flowchart illustrating calculation processing of an advance angle correction amount in FIG. 4.

According to a fourth aspect of the present invention, in the control apparatus for the internal combustion engine described in one of the first to third aspects, the ignition timing correction unit limits an advance angle correction amount IGMF(k) for correcting the ignition timing IGLOG to the advance angle side to a predetermined limit value IGLMT or less (steps 35 and 36 in FIG. 5).

According to this configuration, the advance angle correction amount for correcting the ignition timing to the advance angle side is limited to be equal to or smaller than the limit value. Therefore, even when an error occurs in detection of the single misfire or in the misfire determination based on the detection, the ignition timing will no longer be excessively corrected to the advance angle side. As a result, exhaust gas characteristic values can be maintained within various regulation values.

DETAILED DESCRIPTION

Figure 1:
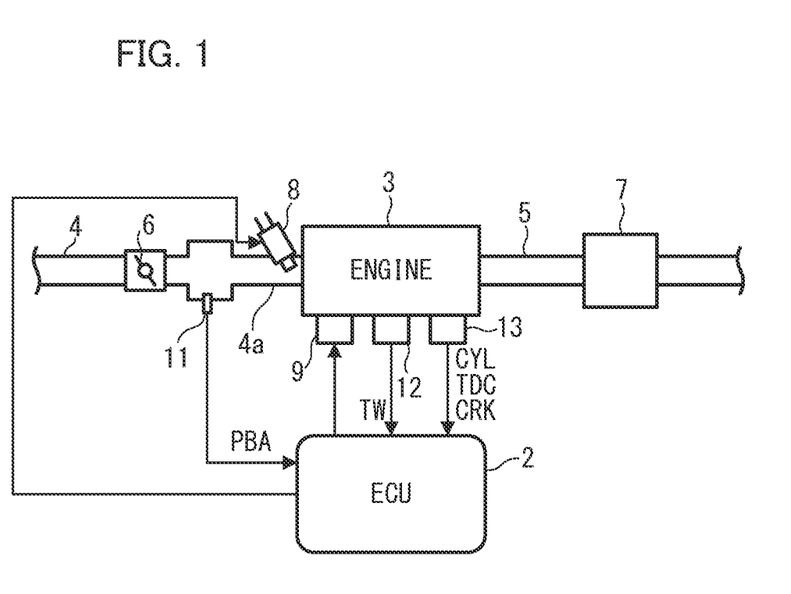
FIG. 1 is a diagram schematically illustrating an internal combustion engine and a control apparatus to which the present invention is applied.

Hereinafter, preferred embodiments of the present invention will be described in detail with reference to the drawings. An internal combustion engine (hereinafter, referred to as "engine") 3 illustrated in FIG. 1 is mounted as a power source in, for example, a vehicle (not illustrated), and includes a plurality of (for example, four) cylinders (not illustrated). An intake pipe 4, through which air (fresh air) flows, and an exhaust pipe 5, through which exhaust gas flows, are connected with the engine 3. The intake pipe 4 is provided with a throttle valve 6 for adjusting the amount of intake air into the engine 3, and the exhaust pipe 5 is provided with a catalyst converter 7 for purifying the exhaust gas.

A fuel injection valve 8 for injecting fuel is provided for every cylinder, in an intake manifold 4a, which is connected with the intake pipe 4. The valve opening time of the fuel injection valve 8 is controlled by a control signal from an electronic control unit (ECU) 2 to be described later, and thus a fuel injection amount of each cylinder is controlled.

In the engine 3, an ignition plug 9 for igniting air-fuel mixture in a combustion chamber is provided for every cylinder. An ignition timing IGLOG of the ignition plug 9 is controlled by a control signal from the ECU 2.

In addition, an intake pressure sensor 11 for detecting pressure (intake pressure) PBA in the intake pipe 4 is provided on an immediately downstream side of the throttle valve 6 of the intake pipe 4, and the engine 3 is provided with a water temperature sensor 12 for detecting a cooling water temperature (engine water temperature) TW of the engine 3. These detection signals are output to the ECU 2.

Furthermore, a crank shaft (not illustrated) of the engine 3 is provided with a crank angle position sensor 13 for detecting a rotation angle of the crank shaft. The crank angle position sensor 13 includes a magnet rotor and an MRE pickup, and outputs a CYL signal, a TDC signal, and a CRK signal, which are pulse signals, to the ECU 2 in accordance with the rotation of the crankshaft.

The CYL signal is for distinguishing among cylinders of the engine 3, and is output at a predetermined crank angle position of a specific cylinder. The TDC signal is output at a timing when a piston (not illustrated) is located at a predetermined crank angle position slightly before reaching the top dead center of the start timing of the intake stroke in any of the cylinders. In addition, the CRK signal is output at every constant crank angle (for example, six degrees) shorter than the TDC signal.

The CYL signal, the TDC signal, and the CRK signal are used for timing control of fuel injection timing, ignition timing, and the like in each cylinder and for detection of an engine speed (rotational speed) NE. As will be described later, in the present embodiment, in particular, a misfire of the engine 3 is determined, based on a generation time interval (hereinafter, referred to as a "time parameter") CRME of the CRK signal.

The ECU 2 includes a microcomputer including a CPU, a RAM, a ROM, an input and output interface (none of which is illustrated), and the like. The above RAM includes a buffer memory for storing a large number of time parameters CRME.

The ECU 2 conducts engine control including intake air amount control via the throttle valve 6, fuel injection control via the fuel injection valve 8, and ignition timing control via the ignition plug 9 in accordance with a control program stored in the ROM. In the present embodiment, in particular, misfire determination processing of determining a misfire of the engine 3 for every cylinder is conducted, based on the time parameter CRME, and ignition timing control processing of controlling the ignition timing for every cylinder is conducted, based on a determination result of the misfire determination processing. In the present embodiment, a rotational speed parameter detection unit, a single misfire detection unit, a misfire counter, a misfire determination unit, and an ignition timing correction unit are configured with the ECU 2.

Figure 2A:
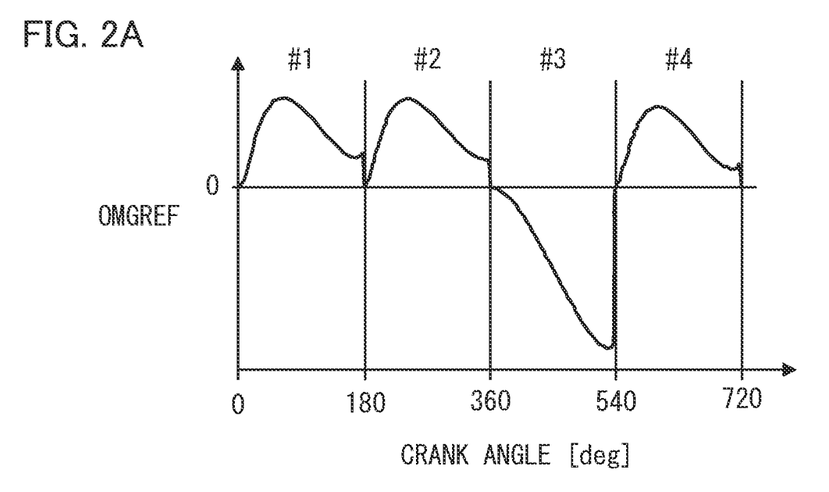
FIGS. 2A and 2B are each a diagram for describing a method for detecting a single misfire.
Figure 2B:
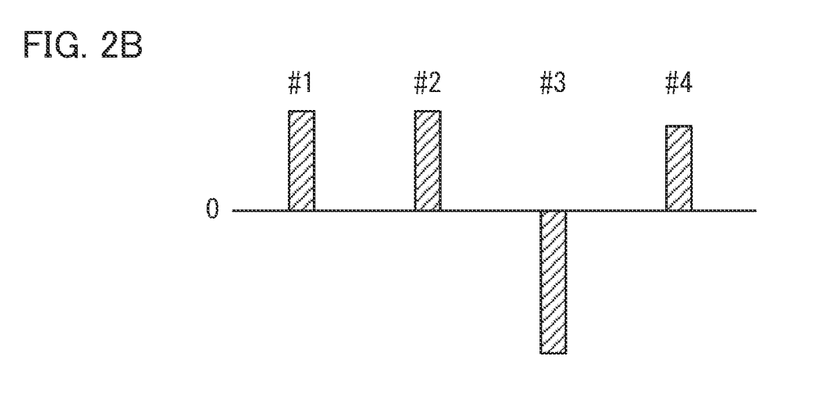

Next, referring to FIGS. 2A and 2B, a detection method of a single misfire (an individual misfire for every ignition) in the present embodiment will be described. FIG. 2A illustrates transitions of a relative rotational speed OMGREF with the rotational speed detected in the vicinity of the compression top dead center of each cylinder of the engine 3 as a reference (hereinafter, referred to as a "reference rotational speed"). The relative rotational speed OMGREF is calculated by subtracting the reference rotational speed from a rotational speed detected (calculated from the time parameter CRME) at every crank angle of six degrees that which is a generation interval of the CRK signal. To identify four cylinders, #1 to #4 in FIG. 2A are cylinder identification numbers that have been assigned in an ignition order.

From the above definition, in the combustion stroke after reaching the compression top dead center, the relative rotational speed OMGREF becomes a smaller value in a case where a misfire has occurred than a value in a case where ignition is normally conducted. That is, in the example of FIG. 2A, it is estimated that combustion is normally conducted in #1, #2, and #4 cylinders, and the misfire is occurring in #3 cylinder.

Therefore, regarding an integrated value (hereinafter, referred to as a "misfire determination parameter") obtained by integrating the relative rotational speed OMGREF calculated at every crank angle of six degrees over one TDC period (a period of a crank angle of 180 degrees) corresponding to a combustion stroke, it is a negative value in #3 cylinder in which the misfire has occurred, and is a positive value in #1, #2, and #4 cylinders in which combustion has been normally conducted, as illustrated in the bar graph of FIG. 2B. From the foregoing, it becomes possible to determine (detect) a single misfire for every cylinder by use of the misfire determination parameter.

FIG. 3 is a flowchart of misfire determination processing including the above-described detection of the single misfire. This processing is performed by the ECU 2 in synchronization with the generation of the TDC signal. Note that regarding a time parameter CRME(i), which is a time interval of the CRK signal to be generated at every crank angle of six degrees, data corresponding to the crank angle of 720 degrees (a data identification number i=0 to ND−1, the number of data ND=120) is stored in the buffer memory in the RAM.

In addition, in a case where k (1 to 4) represents a cylinder identification number in the ignition order and NTDC represents the number of data for one TDC period (NTDC=30 in the present embodiment), an arithmetic operation is performed from the data identification number i of (k−1)·NTDC to (k·NTDC−1) while the present processing is being performed once. For example, in a case where processing of this time is performed for #1 cylinder (k=1), the data identification number i takes a value from 0 to (NTDC−1) (=29), and in a case where the processing of this time is performed for #4 cylinder (k=4), the data identification number i takes a value from 3NTDC(=90) to (4NTDC−1) (=119).

In the processing of FIG. 3, first, in step 1 (illustrated as "S1", hereinafter, the same will apply), it is determined whether a catalyst warm-up control flag F FIRE is "1". The catalyst warm-up control flag F FIRE is set to "1", after the cold start of the engine 3, in order to promote the activation of the catalyst converter 7, while the catalyst warm-up control for controlling the ignition timing to a retard angle side and warming up the catalyst converter 7 is being conducted. In a case where the answer to step 1 is NO and the catalyst warm-up control is not being conducted, the present processing ends without change.

On the other hand, in a case where the answer to step 1 is YES and the catalyst warm-up control is being conducted, the processing proceeds to step 2, and the time parameter CRME(i) is converted into a rotational speed OMG(i) (rad/s) by the following expression 1.

[Expression 1]

$$OMG(i)=D\theta/CRME(i) \quad (1)$$

Here, $D\theta$ represents an angular interval $4\pi/ND$ for measuring the time parameter CRME, and is $\pi/30$ (rad) in the present embodiment.

Next, in step 3, 720-degree filter processing is performed for the rotational speed OMG in accordance with the following expression 2 to calculate a rotational speed OMGR(i) that has been subjected to the filter processing.

[Expression 2]

$$OMGR(i)=OMG(i)-(OMG(ND)-OMG(0))\times D\theta\times i/4\pi \quad (2)$$

Such 720-degree filtering processing is a process of canceling a linear change part in a period of one cycle (crank angle of 720 degrees) and extracting a variation of a relatively short cycle.

Next, in step 4, a relative rotational speed OMGREF(i) is calculated by the following expression 3.

[Expression 3]

$$OMGREF(i)=OMGR(i)-OMGR((k-1)NTDC) \quad (3)$$

Here, OMGR ((k−1)NTDC) is a reference rotational speed, and corresponds to the rotational speed OMGR that has been subjected to the filter processing at the compression top dead center of the cylinder that is a misfire determination target.

Next, in step 5, an integrated value of the relative rotational speed OMGREF is calculated as a misfire determination parameter MFJUD(k) by the following expression 4.

[Expression 4]

$$MFJUD(k) = \sum_{i=(k-1)NTDC}^{kNTDC-1} OMGREF(i) \quad (4)$$

Next, in step 6, it is determined whether the misfire determination parameter MFJUD(k) is a negative value (<0). In a case where the answer is NO and MFJUD(k)≥0, it is determined that combustion has been normally conducted in #k cylinder, which is a determination target of this time, a single misfire flag F_MF(k) is set to "0" (step 7), and in addition, the value of a misfire counter (misfire counter value) C_MF(k) is maintained at a previous value (step 8), and subsequently the processing proceeds to step 13. Note that the misfire counter value C_MF(k) is reset to "0" at the start of the catalyst warm-up control, and represents the number of detection times of the single misfire for every cylinder, as will be described later.

On the other hand, in a case where the answer of step 6 is YES and the misfire determination parameter MFJUD(k) is a negative value, it is determined that the single misfire has occurred in #k cylinder. The single misfire flag F_MF(k) is set to "1" (step 9), and the misfire counter value C_MF(k) is incremented by "1" (step 10).

Next, in step 11, it is determined whether the misfire counter value C_MF(k) that has been incremented is equal to or larger than a predetermined threshold value CREF. In a case where the answer is NO, that is, in a case where the number of detection times of the single misfire for #k cylinder has not reached the threshold value CREF, it is determined that the advance angle correction of the ignition timing IGLOG is not yet to be made, and the processing proceeds to step 13.

On the other hand, in a case where the answer of step 11 is YES and the number of detection times of the single misfire for #k cylinder reaches the threshold value CREF, it is determined that misfire is occurring in #k cylinder, and in addition, the advance angle correction of the ignition timing IGLOG is to be made. The processing proceeds to step 12 and the advance angle correction flag F_ADV(k) is set to "1".

In step 13 subsequent to step 8, 11, or 12, it is determined whether the cylinder identification number k of this time is equal to the number of cylinders N. In a case where the answer is NO, the cylinder identification number k is incremented by "1" (step 14), and the present processing ends. On the other hand, in a case where k=N, the cylinder identification number k is returned to "1" (step 15), and the present processing ends.

By repeatedly performing the misfire determination processing of FIG. 3 described above, the presence or absence of the single misfire is detected for every cylinder, the number of detection times of the misfire is counted as the misfire counter value C_MF(k), and in addition, when the misfire counter value C_MF(k) reaches the threshold value CREF, it is determined that misfire is occurring in the cylinder, and the advance angle correction flag F_ADV(k) is set to "1".

Figure 4:
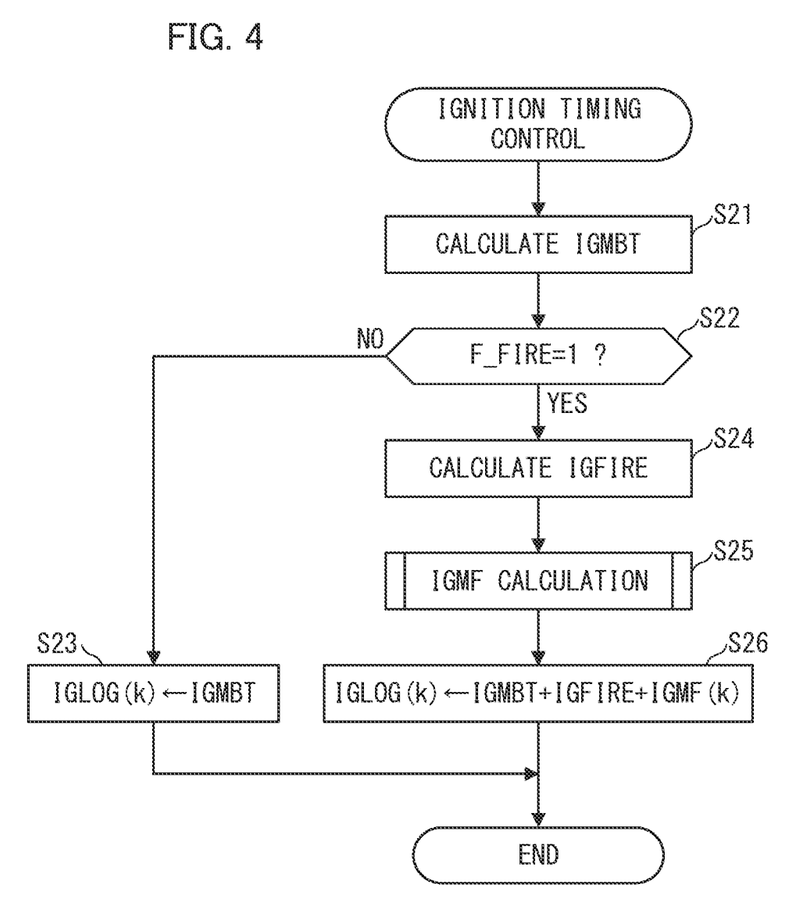
FIG. 4 is a flowchart illustrating ignition timing control processing using a determination result by the misfire determination processing.

Next, referring to FIG. 4, ignition timing control processing to be performed, based on a determination result by the above misfire determination processing, will be described. This processing is performed for every cylinder in synchronization with the generation of the TDC signal. Note that in the present embodiment, the ignition timing IGLOG is defined as an advance angle amount from the compression top dead center in each cylinder. That is to say, the ignition timing IGLOG is calculated such that the advance angle side is represented by a positive value and a correction amount on a retard angle side is calculated as a negative value with the compression top dead center as a reference (0 degrees).

In the present processing, first, in step 21, an optimum ignition timing IGMBT is calculated. The optimum ignition timing IGMBT is an ignition timing at which the maximum torque of the engine 3 is obtained, and is calculated, for example, by searching a predetermined map (not illustrated) in accordance with the engine speed NE and intake pressure PBA that have been detected.

Next, in step 22, it is determined whether the catalyst warm-up control flag F FIRE is "1". In a case where the answer is NO and the catalyst warm-up control is not being conducted, an ignition timing IGLOG(k) is set to the optimum ignition timing IGMBT (step 23), and the present processing ends.

In a case where the answer to step 22 is YES and the catalyst warm-up control is being conducted, the processing proceeds to step 24 and a retard angle amount IGFIRE of the ignition timing for warming up the catalyst is calculated. For example, the retard angle amount IGFIRE for warming up the catalyst is calculated as a negative value by searching a predetermined map (not illustrated) in accordance with the engine water temperature TW that has been detected.

Next, in step 25, an advance angle correction amount IGMF of the ignition timing for suppressing a misfire is calculated. The calculation is to be conducted in processing of FIG. 5. In the present processing, first, in step 31, it is determined whether the advance angle correction flag F_ADV(k) is "1". In a case where the answer is NO, an advance angle correction amount IGMF(k) is set to a value 0 (step 32), and the present processing ends.

On the other hand, in a case where the answer in step 31 is YES and F_ADV(k)=1, and it is determined that the ignition timing should be subject to the advance angle correction in order to suppress the misfire in #k cylinder, the processing proceeds to step 33, and it is determined whether a warm-up request flag F_FIREREQ is "1". The warm-up request flag F_FIREEQ is set to "1", when the catalyst warm-up control is requested, and is set to "0", when it is determined that the catalyst warm-up control should be ended while the catalyst warm-up control is being conducted.

In a case where the answer to step 33 is YES, the advance angle correction amount IGMF(k) is calculated by the following expression 5 in step 34.

[Expression 5]

$$IGMF(k)=\Delta IG\times(C\_MF(k)-CREF+1) \quad (5)$$

Here, $\Delta IG$ represents a predetermined amount for setting the advance angle correction amount IGMF. As understood from the expression 5, the advance angle correction amount IGMF(k) is set to a predetermined amount $\Delta IG$, when the misfire counter value C_MF(k) reaches the threshold value CREF. Thereafter, the predetermined amount $\Delta IG$ is added whenever a single misfire is detected.

Next, it is determined whether the advance angle correction amount IGMF(k) that has been detected is larger than a predetermined limit value IGLMT (step 35). In a case where the answer is NO and the advance angle correction amount IGMF(k) is equal to or smaller than the limit value IGLMT, the present processing ends without change.

On the other hand, in a case where the answer in step 35 is YES and the advance angle correction amount IGMF(k) exceeds the limit value IGLMT, the processing proceeds to step 36. The advance angle correction amount IGMF(k) is limited by being set to the limit value IGLMT, and the present processing ends.

In addition, in a case where the answer to step 33 is NO and the warm-up request flag F_FIREREQ is reset to "0", a value obtained by subtracting the predetermined amount $\Delta IG$ from the advance angle correction amount IGMF(k) until then is calculated in step 37, as the advance angle correction amount IGMF(k) of this time.

Next, it is determined whether the advance angle correction amount IGMF(k) that has been calculated is smaller than a value 0 (step 38). In a case where the answer is NO and the advance angle correction amount IGMF(k) is equal to or larger than the value 0, the present processing ends without change. On the other hand, in a case where the answer in step 38 is YES and when the advance angle correction amount IGMF(k) becomes a negative value, the processing proceeds to step 39. The advance angle correction amount IGMF(k) is set to a value 0, and the present processing ends. As described heretofore, the advance angle correction amount IGMF(k) is decreased by the predetermined amount $\Delta IG$ in a stepwise manner to the value 0, whenever the processing for the cylinder is performed at the end of the catalyst warm-up control.

Returning to FIG. 4, in step 26 subsequent to step 25, by adding the retard angle amount IGFIRE for warming up the catalyst and the advance angle correction amount IGMF(k) to the optimum ignition timing IGMBT by the following expression 6, IGLOG(k) while the catalyst warm-up control is being conducted is calculated, and the present processing ends.

[Expression 6]

$$IGLOG(k)=IGMBT+IGFIRE+IGMF(k) \tag{6}$$

Next, referring to FIG. 6, an operation example obtained by the processing of FIGS. 3 to 5 will be described. This operation example is an example of a case where the single misfire is not detected in any of #1, #2, or #4 cylinder among the four cylinders, because the combustion is normally conducted, whereas the single misfire repeatedly occurs in #3 cylinder, because the combustion is unstable.

In this example, when the warm-up request flag F_FIREREQ is set to "1" at time t1, the catalyst warm-up control flag F FIRE is set to "1" at the same time, and the catalyst warm-up control is started. In accordance with this, the retard angle IGFIRE for warming up the catalyst is set (step 24 in FIG. 4), and the ignition timing IGLOG is controlled to the retard angle side by a set amount (step 26).

Subsequently, when the misfire determination parameter MFJUD(3) of #3 cylinder becomes smaller than a misfire threshold value (=0) at time t2, it is considered that a single misfire has been detected in #3 cylinder, the single misfire flag F_MF(3) is set to "1", and in addition, the misfire counter value C_MF(3) is incremented by "1" from 0 (step 6: YES, steps 9 and 10 in FIG. 3). Regarding the other cylinders (#1, #2, and #4), the combustion is stable. Therefore, the single misfire is not detected, because the misfire determination parameter MFJUD(k) does not become smaller than the misfire threshold value, and the misfire counter value C_MF remains "0" (step 6: NO, steps 7 and 8).

Thereafter, whenever the single misfire is detected in #3 cylinder, the misfire counter value C_MF(3) is incremented by "1". Then, when the misfire counter value C_MF(3) reaches the threshold value CREF (time t3), it is determined that the misfire has occurred in #3 cylinder, the advance angle correction flag F_ADV(3) is set to "1" (step 11: YES, step 12 in FIG. 3), and in addition, the advance angle correction amount IGMF(3) is set to a predetermined amount ΔIG. The ignition timing IGLOG of #3 cylinder is corrected to the advance angle side by such a predetermined amount ΔIG (step 34 in FIG. 5, step 26 in FIG. 4).

Subsequently, whenever the single misfire is detected in #3 cylinder (times t4 to t8), the misfire counter value C_MF(3) is incremented, and in addition, the advance angle correction amount IGMF(3) is increased by the predetermined amount ΔIG in a stepwise manner. Accordingly, the ignition timing IGLOG of #3 cylinder is corrected to the advance angle side more. In this example, the advance angle correction amount IGMF(3) does not reach the limit value IGLMT, and thus is restricted from it.

Then, the warm-up request flag F_FIREREQ is reset to "0" at time t9. Whenever the processing for #3 cylinder is performed, the advance angle correction amount IGMF(k) is decreased by the predetermined amount ΔIG in a stepwise manner, until the value reaches the value 0 (time t10) (steps 37 to 39 in FIG. 5). Then, when the catalyst warm-up control flag F FIRE is reset to "0" at time t11, the misfire determination based on the detection of the single misfire ends in accordance with the end of the catalyst warm-up control, and in addition, the ignition timing control shifts to normal control.

Note that in this example, as described above, no single misfire is detected in any of #1, #2, or #4 cylinder, and the misfire counter value C_MF remains "0" during the catalyst warm-up control. Therefore, the misfire is not determined like #3 cylinder, the advance angle correction amount IGMF is maintained at 0, and the advance angle correction of the ignition timing IGLOG is not made.

Next, referring to FIG. 7, an operation example different from that of FIG. 6, which is obtained by the processing of FIGS. 3 to 5, will be described. This operation example is an example of a case where the combustion is unstable in all #1 to #4 cylinders and the single misfire is detected frequently in a repeated manner. Therefore, the operations of #1 to #4 cylinders are substantially the same. Hence, the parameters other than the misfire counter value C_MF(k) in FIG. 7 representatively indicate values of a certain cylinder in order to simplify the illustration.

In this example, at time t21, the warm-up request flag F_FIREREQ and the catalyst warm-up control flag F FIRE are set to "1", and the catalyst warm-up control is started. Subsequently, in each cylinder, when the misfire determination parameter MFJUD(k) becomes smaller than the misfire threshold value (=0), the single misfire is frequently detected. Whenever the single misfire is detected, the single misfire flag F_MF(k) is set to "1", and the misfire counter value C_MF(k) is incremented by "1".

Then, for example, when the misfire counter value C_MF(k) of a certain cylinder reaches the threshold value CREF at time t22, it is determined that misfire has occurred in such a certain cylinder, the advance angle correction flag F_ADV(k) is set to "1", and in addition, the advance angle correction amount IGMF(k) is set to the predetermined amount ΔIG. Subsequently, whenever the single misfire is detected in such a cylinder, the misfire counter value C_MF(k) is incremented and the predetermined amount ΔIG is added to the advance angle correction amount IGMF(k). Accordingly, the ignition timing IGLOG of such a cylinder is corrected to the advance angle side.

In addition, when the advance angle correction amount IGMF(k) that has been added exceeds the limit value IGLMT at time t23 (step 35: YES in FIG. 5), the advance angle correction amount IGMF(k) is limited to the limit value IGLMT (step 36).

Figure 6:
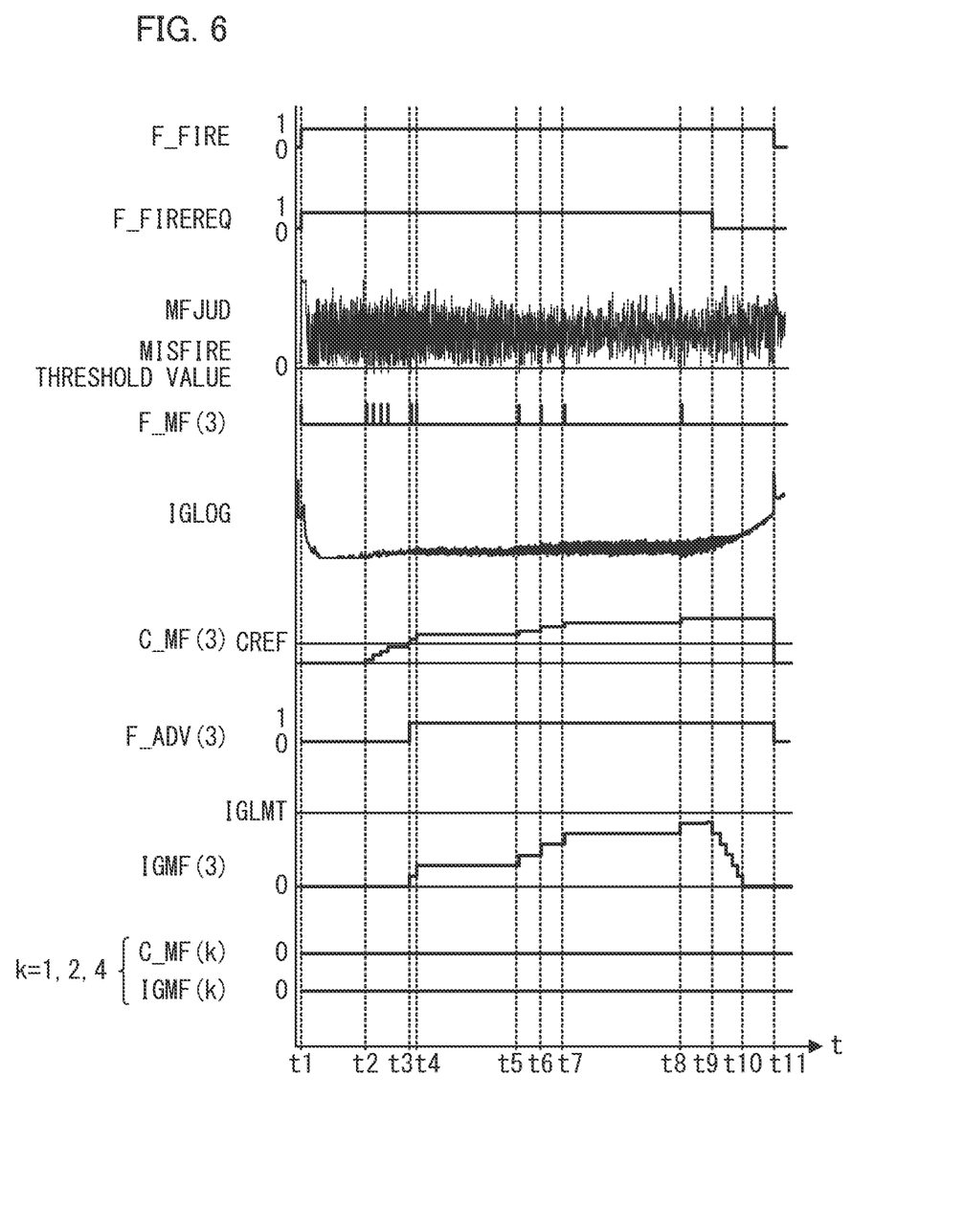
FIG. 6 is a timing chart illustrating an operation example by the processing of FIGS. 3 to 5.
Figure 7:
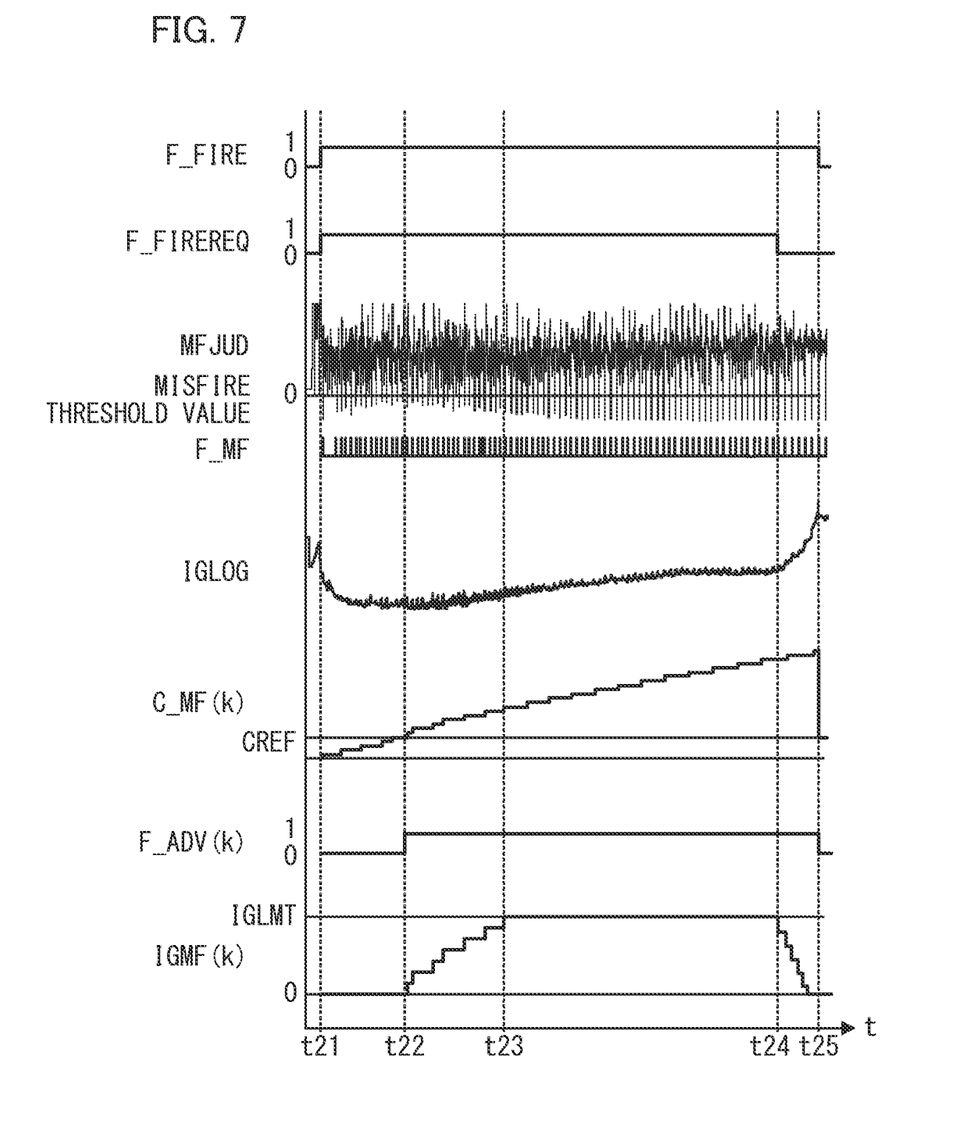
FIG. 7 is a timing chart illustrating another operation example by the processing of FIGS. 3 to 5.

The subsequent operation is the same as in the case of FIG. 6. The warm-up request flag F_FIREREQ is reset to "0" at time t24. Whenever the processing for such a cylinder is performed, the advance angle correction amount IGMF(k) is decreased by the predetermined amount ΔIG in a stepwise manner, until the advance angle correction amount IGMF(k) reaches the value 0. Then, when the catalyst warm-up control flag F FIRE is reset to "0" at time t25, the catalyst warm-up control ends. Accordingly, the misfire determination based on the detection of the single misfire ends, and the ignition timing control shifts to normal control.

As described heretofore, according to the present embodiment, when a single misfire is detected in one cylinder on one occasion only, the single misfire having occurred in such one cylinder is not immediately determined. Instead, the presence or absence of the misfire in such one cylinder is determined, based on the misfire counter value C_MF(k), which is the number of detection times of the single misfire for every cylinder. Accordingly, the presence or absence of the misfire can be accurately detected for every cylinder without being directly affected by erroneous detection of the single misfire due to a temporary decrease in the rotational speed of the engine 3, noise of the detection signal, or the like, and in addition, the cylinder in which the misfire has occurred can be identified.

In addition, the ignition timing IGLOG(k) of the cylinder in which it has been determined that that the misfire is occurring is corrected to the advance angle side by the advance angle correction amount IGMF(k). Accordingly, the misfire of such a cylinder can be suppressed and the combustion state can be stabilized, and thus, exhaust gas characteristics and idle stability can be improved. Furthermore, by checking the combustion state when the ignition timing IGLOG(k) of the cylinder, in which the combustion is unstable and the misfire is suspected, is advanced in angle, it becomes possible to easily identify a case where the combustion is improved by the advance angle and a case where the combustion is not improved even with the advance angle and the misfire is occurring for some reason. Accordingly, misfire detectability can be improved.

Furthermore, the advance angle correction amount IGMF is limited to be equal to or smaller than the limit value IGLMT. Therefore, even when an error occurs in detection of the single misfire or in the misfire determination based on the detection, the ignition timing IGLOG will no longer be excessively corrected to the advance angle side. As a result, exhaust gas characteristic values can be maintained within various regulation values.

In addition, the misfire determination and the advance angle correction at the ignition timing based on a determination result are made, while the catalyst warm-up control, in which a misfire is particularly likely to occur, is being conducted. Thus, the effects of suppressing the misfire and stabilizing the combustion state can be effectively obtained in particular.

Note that the present invention is not limited to the described embodiments, and can be implemented in various aspects. For example, in one embodiment, the misfire determination and the advance angle correction of the ignition timing based on a determination result are made, under the condition that the catalyst warm-up control in which the misfire is particularly likely to occur is being conducted. It is a matter of course that the present invention is not limited to this, and may be implemented under any other condition that the misfire is likely to occur.

In addition, in one embodiment, the misfire threshold value is set to a fixed value (=0) to be compared with the misfire determination parameter MFJUD, without being limited to this, and may be variably set in accordance with the engine speed NE, the engine water temperature TW, or the like. In addition, the detailed configuration can be changed as appropriate within the scope of the gist of the present invention.

What is claimed is:

1. A control apparatus for an internal combustion engine, the control apparatus comprising:
    a rotational speed parameter detection unit configured to detect a rotational speed parameter that represents a rotational speed of the internal combustion engine including a plurality of cylinders;
    a single misfire detection unit configured to detect a single misfire that is a misfire for every ignition for each of the plurality of cylinders, based on the rotational speed parameter that has been detected in each combustion stroke of the plurality of cylinders;
    a misfire counter configured to count, as a misfire counter value, the number of times that the single misfire has been detected for each of the plurality of cylinders;
    a misfire determination unit configured to determine whether the misfire is occurring in each of the plurality of cylinders, based on the misfire counter value; and
    an ignition timing correction unit configured to correct an ignition timing of the cylinder that has been determined that the misfire is occurring to an advance angle side, wherein
    the misfire determination unit determines that the counter value reaches a predetermined value, and
    the ignition timing correction unit corrects the ignition timing of the cylinder to the advance angle side by a predetermined amount Whenever the single misfire is detected, after the misfire counter value reaches the predetermined value,
    the internal combustion engine includes a catalyst for purifying exhaust gas,
    the misfire determination unit determines the misfire, while catalyst warm-up control for controlling the ignition timing to a retard angle side is being conducted to promote warm-up of the catalyst,
    the ignition timing correction unit corrects the ignition timing of the cylinder to the retard angle side by a predetermined amount until an advance angle correction amount for correcting the ignition timing to the advance angle side reaches the value 0, after it is determined that the catalyst warm-up control should be ended, and
    the catalyst warm-up control is ended when the advance angle correction amount reaches the value 0.

2. The control apparatus for the internal combustion engine according to claim 1, wherein
    the ignition timing correction unit limits the advance angle correction amount for correcting the ignition timing to the advance angle side to a predetermined limit value or less.

* * * * *